July 11, 1933.  F. F. WOLF  1,917,350
MACHINE FOR CLEANING CANS
Filed Nov. 4, 1930   8 Sheets-Sheet 1

July 11, 1933.  F. F. WOLF  1,917,350
MACHINE FOR CLEANING CANS
Filed Nov. 4, 1930  8 Sheets-Sheet 7

Inventor
Frank F. Wolf
By Popp and Powers
Attorneys

Patented July 11, 1933

1,917,350

UNITED STATES PATENT OFFICE

FRANK F. WOLF, OF CATTARAUGUS, NEW YORK, ASSIGNOR TO OAKES & BURGER CO. INC., OF CATTARAUGUS, NEW YORK, A CORPORATION OF NEW YORK

MACHINE FOR CLEANING CANS

Application filed November 4, 1930. Serial No. 493,299.

This invention relates to improvements in can washing machines of the kind in which the cans and their covers are washed, sterilized and dried in successive operations and the invention consists generally in a novel construction and arrangement of the various parts utilized in the performance of the several operations whereby simplicity of construction and operation is obtained. The invention also contemplates a novel method of cleaning the cans and their covers.

One object of the invention is to provide a mechanism for moving the cans step-by-step through the machine so that they may be presented successively to washing, sterilizing and drying equipment, the said mechanism being designed to avoid jamming with possible breakage of parts in the event that a can is improperly placed at the starting position.

Another object is to provide a mechanism for moving the cans in the manner described in which the cans are engaged by said mechanism only during the intervals that they are being advanced, the engaging means being positively actuated to be withdrawn from the path traversed by the cans during its retractory movement preparatory to its next advancing movement.

A further object is a novel method of treating the cans and their covers whereby they may be uniformly washed, sterilized and dried thoroughly and at a rapid rate.

The invention is illustrated in the accompanying drawings, in which:—

The various parts of the machine, as illustrated, are supported in a suitable framework and include a horizontal runway through which the cans are advanced step-by-step while inverted and an inclined elevated cover guideway through which the covers are moved while supported in a vertical sidewise position. The said runway is provided by parallel rail supports 20 along which the cans slide and parallel guide rails 21 between which the cans slide. The runway also includes a plate 22 upon which an attendant, after having first removed a cover from its can, places the latter upside down and pushes it forward upon the rail supports 20 so that it may be advanced through the machine in the manner to be described. At the same time, the cover which has been removed from the can is positioned in the inclined cover guideway which is provided by guide rods 23. The cover is supported on its side upon and moved along said runway by a chain 24, the latter being provided with fingers 25, one of which extends upwardly to engage the cover by its neck. The entrance to the cover guideway is provided by a plate 26 which is preferably inclined in the direction of the chain 24 so that the cover will roll toward the latter.

An angle member 27 is secured to the plate 26 to provide, with a vertically extending portion 28 of the latter, a passageway for the flange of the cover, the neck of the latter rolling along the vertical leg of the angle member 27.

The can runway extends through a plurality of zones or stations A, B, C, D, E, F, G, H, I and J, the centers of which are preferably equally spaced apart. At each of these zones or stations, means is provided for subjecting the cans to various treatments cooperating in sequence to progressively wash, sterilize and dry them.

In accordance with the invention, means is provided whereby a can is advanced through the can runway step-by-step and caused to pause for a determined interval at each of the treating stations. The said means, as shown in detail in Figures 11 to 18 inclusive, includes carriage members 29 and 30 arranged lengthwise of the machine adjacent the path to be traversed by the cans. The said members carry a series of fingers 31, each of which is pivotally connected as at 32 and 33 to the carriage members 29 and 30 respectively, it being noted that a bar 32a is also supported upon the carriage member 30 by spacing blocks 32b, the said bar being positioned over the ends of the fingers 31. The other carriage member 29 is supported adjacent its companion member 30 by the fingers 31, the free ends of which rest in sliding contact upon the adjacent guide rail 21. By virtue of this construction, carriage member 29 is capable of movement toward and away from the carriage member 30 in addition to being capable of relative longitudinal movement therewith.

Figure 4:
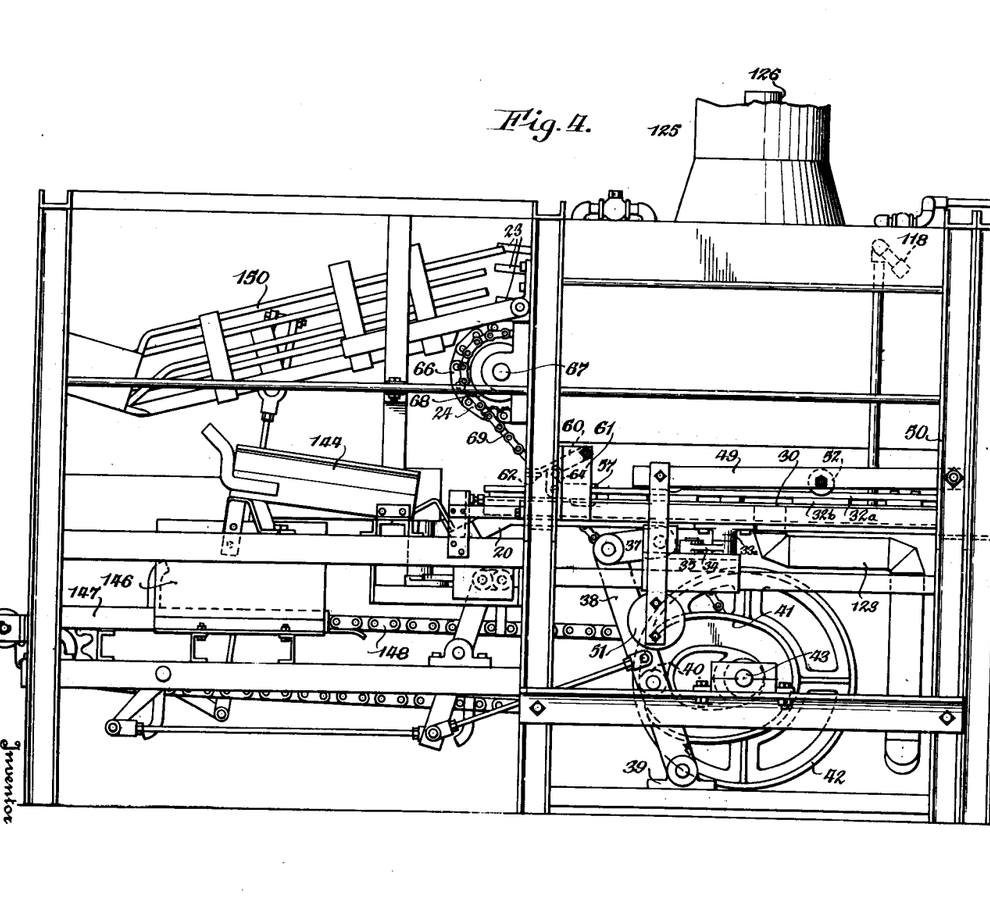
Figure 4 is a side elevation of the same end of the machine, as shown in Figure 2, but of the opposite side.
Figure 7:
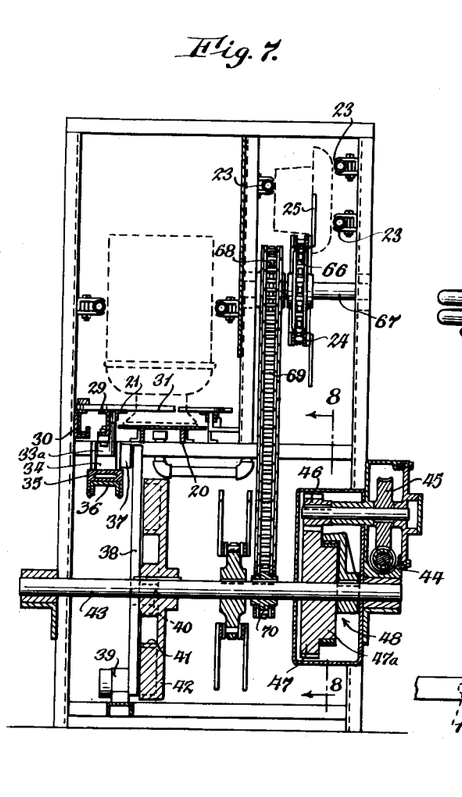
Figure 7 is a transverse section taken along line 7—7 of Figure 2.
Figure 8:
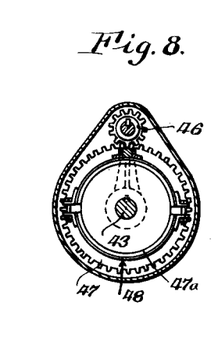
Figure 8 is a detail section of the slip clutch mechanism taken along line 8—8 of Figure 7.

A downwardly extending boss or lug 33a is suitably secured to the carriage member 29 and the said boss or lug is connected by a link 34 to a slide block 35, the latter being mounted for movement back and forth upon a horizontal channel guide 36. The slide block 35 is connected by a link 37 to the upper end of a lever 38. The said lever is pivotally mounted at its lower end in a bearing block 39 (see Figure 4). Intermediate its ends the lever 38 carries a roller 40 which extends into a cam groove 41 provided by a cam wheel 42. The latter is mounted upon a transverse shaft 43 which is suitably supported in the framework of the machine and which is connected to a drive shaft 44 through reducing gears 45, 46 and 47 (see Figure 7). The gear 47 is loosely mounted on the shaft 43 but is adapted to drive the latter through a slip clutch 48 which is fixed to the shaft 43 and which frictionally engages an annular extension 47a formed on the gear 47. The clutch 48 is adjusted so that under normal operating conditions it provides a driving connection between the drive shaft 44 and the driven shaft 43. However, if any parts of the machine should become jammed, the driven shaft 43 stops as the frictional engagement between the clutch and annular extension of the gear is insufficient to maintain the driving connection between these parts under the increased load.

It will thus be apparent that by virtue of the connection between the end of the lever 38 and the carriage member 29 a reciprocatory movement is imparted to the latter by the cam wheel 42. This movement of the carriage member 29 is utilized, assuming that the fingers are in a position where they have just reached the limit of their advancing movement, to first pivot the fingers out of the path being traversed by the cans and then to carry them rearward so that they may be operated to engage the next succeeding cans. The pivotal movement of the fingers 31 is obtained by holding the carriage member 30, and also bar 32a, against movement during the initial movement of the carriage member 29 away from either limit of its range of movement. For this purpose, a horizontally extending arm 49 (see Figures 12 and 16) is pivotally connected at one end to a vertical frame member 50 and carries depending from its free end a weight 51. Intermediate its ends the arm 49 carries a roller 52, the free end of the arm and the weight carried thereby being supported by the roller 52 upon the bar 32a. The latter is formed with two arcuate depressions 53 and 53a into and out of which the roller 52 is adapted to ride during reciprocatory movements of the bar 32a, it being understood that the arcuate depressions are designed to hold frictionally against movement the bar 32a and the carriage member therebeneath during the initial movement of the carriage member 29 away from either limit of its range of movement.

Figure 11:
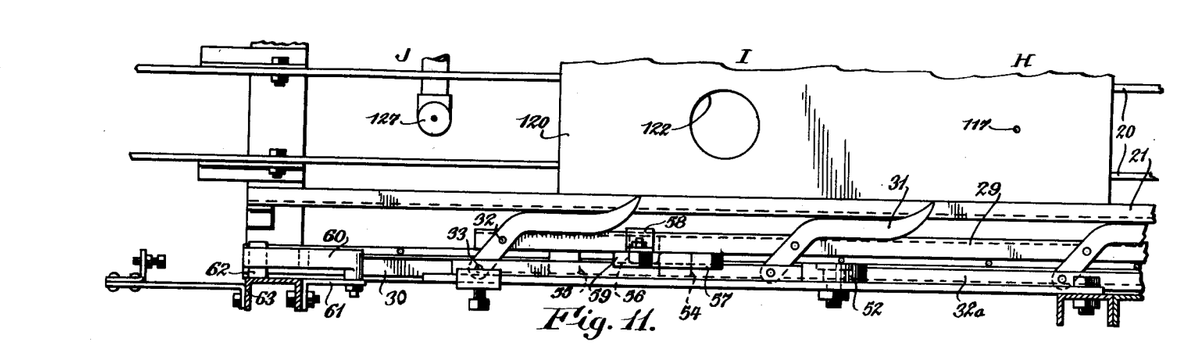
Figure 11 is a fragmentary view in plan of the mechanism by which the cans are advanced through the machine, the said mechanism being shown at one limit of its range of movement.
Figures 12, 13, 14:
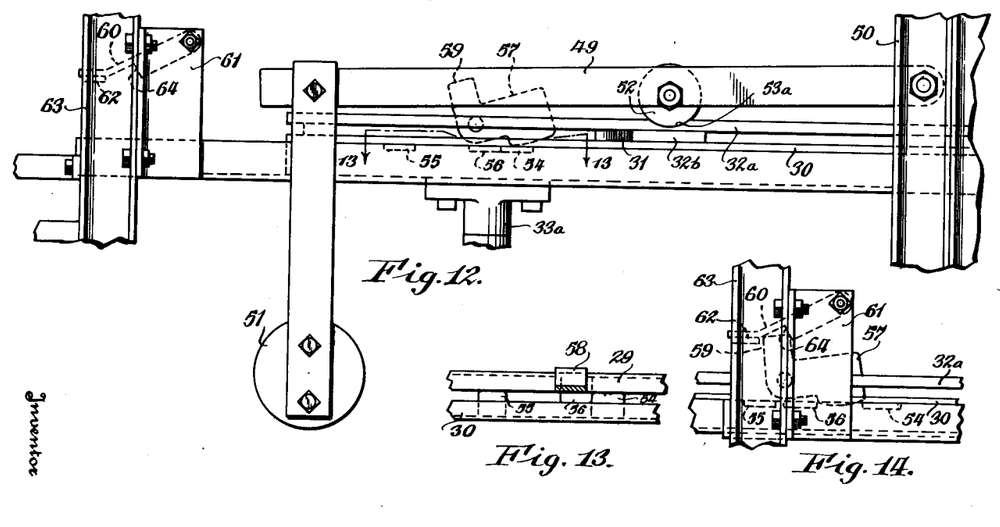
Figure 12 is a view in elevation of the same.
Figure 13 is a fragmentary sectional view taken along line 13—13 of Figure 12.
Figure 14 is a fragmentary view of the mechanism by which the carriage members of the can advancing mechanism are locked and unlocked against relative longitudinal movement.

It will be apparent that when the carriage members 29 and 30 and fingers 31 carried thereby are in the position shown in Figure 11 (this being the position they occupy at the limit of the retractory movement of the carriage member 29) the roller 52 rests in the arcuate depression 53a. Thus, as the carriage member 29 is initially moved forward by its actuating means, the arm 49 through the medium of the roller 52 and the depression 53a, prevents a like movement of the companion carriage member 30. The fingers 31, therefore, are pivoted about their connections with the carriage member 30 and move outwardly into the path traversed by the cans to the position shown in Figure 15 in which position they engage the cans arranged along the rail supports 20. In this connection it is to be noted that during this movement of the fingers 31, the carriage member 29 moves laterally relative to the companion carriage member.

Figure 15:
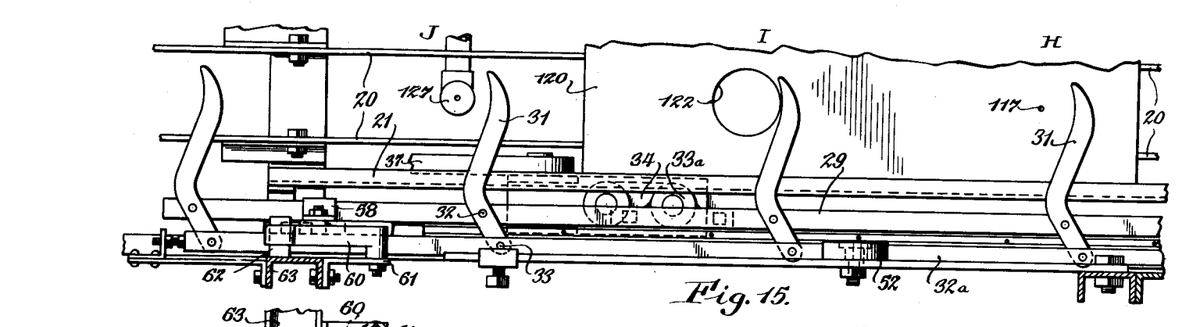
Figure 15 is a fragmentary view similar to Figure 11 showing the can advancing mechanism at the opposite limit of its range of movement.
Figures 16, 17, 18:
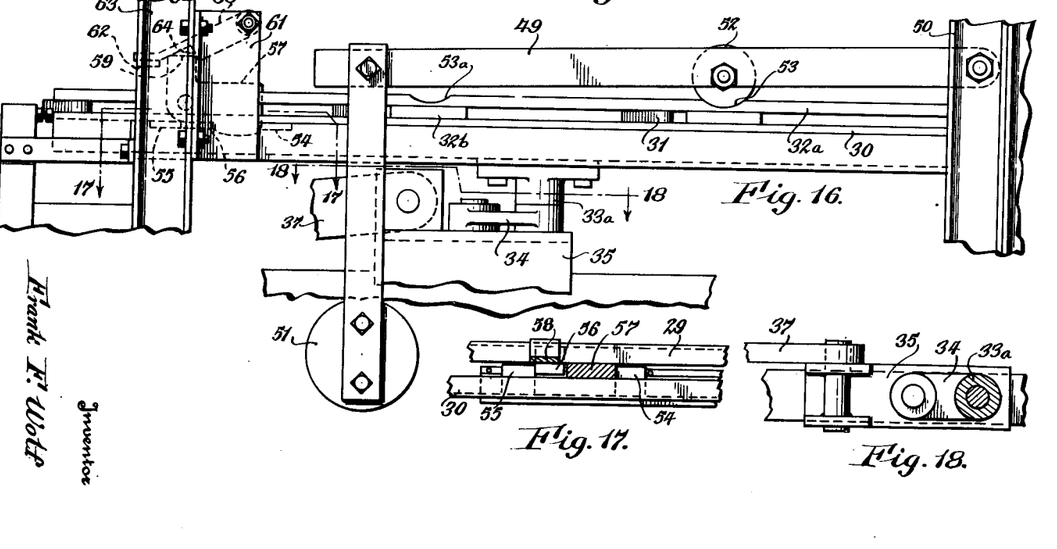
Figure 16 is a side elevation of the same.
Figure 17 is a fragmentary sectional view taken along line 17—17 of Figure 16.
Figure 18 is a fragmentary sectional view taken along line 18—18 of Figure 16.

Means is provided whereby when the fingers 31 reach this position the carriage members 29 and 30 are locked against relative longitudinal movement so that the fingers 31 may be maintained in the position shown in Figure 15 while the said carriage members are moving forward to advance the cans a step through the machine. The carriage member 30 is, therefore, provided with a pair of spaced lugs 54 and 55 and the carriage member 29 is provided with a co-operating lug 56, the latter being capable of movement between the lugs 54 and 55. The distance between the lugs 54 and 55 is substantially equal to the distance that the carriage member 29 must move longitudinally relative to the carriage member 30 to move the fingers 31 from the position shown in Figure 11 to that shown in Figure 15 or vice versa. The roller 52, therefore, is available to hold the carriage member 30 against movement while the lug 56 of the carriage member 29 moves between the two lugs 54 and 55. A locking dog 57 is pivotally mounted upon an upstanding support 58 which is secured to the carriage members 29. The locking dog is carried by the carriage member 29 above the lug 56. When the carriage member 29 has been actuated to retract the fingers 31 to the position shown in Figure 11, the locking dog rests upon the lug 54 of the carriage member 30, (see Figure 12). As the carriage member 29 is moved forward to move the fingers toward their can engaging position, the locking dog rides along the top of the lug 54 until the fingers 31 reach the can engaging position, as shown in Figure 15. At this instant, the lug 56, of the carriage member 29 engages the lug 55 of the carriage member 30 (see Figure 17) and the locking dog 57 drops down into the space between the lug 56 and the lug 54. The carriage members are, therefore, locked against relative longitudinal movement and as the carriage member 29 continues to move forward, it carries the carriage member 30 with it, it being understood that during the initial forward movement of the carriage member 29, the companion member 30 is held against movement by the roller 52 which rests, during this interval, in the depression 53a and that as the lug 56 moves against the lug 55, the carriage member 29, continuing to move forward, carries the carriage member 30 with it, during which movement the roller 52 is forced out of the depression 53a. In connection with the locking dog 57, it is to be noted that its function is to maintain the fingers 31 in the same relative angular positions with respect to the carriage members 29 and 30 during the forwarding movements of the cans. As the lug 56 engages the lug 55, with resultant forward movement of the carriage member 30 the cans, acting against the free ends of the fingers 31 tend to pivot the latter about their connections with the carriage member 29 and would, unless otherwise prevented, move the member 30 with the result that instead of the fingers 31 being moved forward to advance the cans, the said fingers would be pivoted about their connections with carriage member 29 away from the cans. The locking dog 57, therefore, serves to lock the two carriage members 29 and 30 against relative angular movement from the instant that the fingers 31 engage their respective cans until the forwarding movement of the latter has been completed.

Means is provided for unlocking the two carriage members so that the fingers 31 may be withdrawn from out of the path traversed by the cans during their return movement, the fingers while withdrawn being moved past the next succeeding cans in order that as the carriage member 29 again moves forward, they may engage the cans and advance them in the manner described. For this purpose, the locking dog 57 is formed with an upstanding portion 59 which co-operates with a trip member 60, (see Figures 12 and 14) the latter being suitably supported for pivotal movement from the frame of the machine by an angle support 61. The free end of the trip member rests upon a laterally extending member 62 which is carried by a vertical leg 63 of the frame.

As the carriage members 29 and 30 approach the limit of their forward movement, the upstanding position of the locking dog lifts the free end of the trip member and, as the latter returns to its normal position, is positioned behind a shoulder 64 of the trip member. During the return movement of the carriage member 29 toward the opposite limit of its range of movement, the locking dog is pivoted, by means of the shoulder 64 of the trip member to the position shown in Figure 14, in which position its forward lip is supported above the lug 54. Hence, as the carriage member 29 continues to move in the same direction, the dog rides up over the lug 54. During this time, the carriage member 30 is held against longitudinal movement by the arm 49 through the agency of the roller 52 which rests in the arcuate recess 53. The fingers 31, therefore, are pivoted toward a position where they lie out of but along side the path which is traversed by the cans. At the instant they reach this position, the lug 56 engages the lug 54. As the carriage member 29, therefore continues to move, the fingers 31 are carried rearwardly by it and the companion carriage member while supported in this position, the roller 52 being forced, during this movement, out of the depression 53 and as the carriage members reach the limit of their rearward movement, the said roller drops into the depression 53a. Thus, during the initial movement of the carriage member 29 in the opposite direction, the carriage member 30 will be held against movement, thereby pivoting the fingers 31 back into the path of the cans.

From the foregoing, it will be apparent that if an attendant fails to place a can at the proper point in the can runway, for example not far enough in the runway, so that a finger 31 engages the can at the side instead of the back, the carriage member 30 moves forward relative to the member 29, the two members being unlocked at this time, thereby preventing injury to any of the parts of the mechanism.

The chain 24 by which the covers are moved through the guideway provided by the rods 23 is carried by sprockets 65 and 66, the latter being mounted upon a shaft 67. A second sprocket 68 is fixed to the shaft 67 and this sprocket is driven by means of a chain 69 and sprocket 70, the latter being fixed to the shaft 43. Hence, as the shaft 43 is driven to effect a step-by-step movement of the cans through the machine, the covers for the cans are moved continuously through their guideway. A can and its cover are placed in the machine at the same time and the can advancing means and cover advancing means are designed to deliver the two to the delivery mechanism at substantially the same time so that the cover may be placed upon its can.

At stations A, B, C, D, E, F, G, H, I and J means is provided for subjecting the cans to various treatments which I have discovered insure their rapid and effective sterilization, it being noted that the distance between adjacent stations is equal to the distance a can is moved during each forward movement of the advancing mechanism.

A can which has been placed upon the plate 22 is moved by one of the fingers 31 to station A where it pauses during the return movement of the finger to engage the next can which has, in the meantime, been placed in the runway. A nozzle 71, in communication with a convenient supply of steam through a suitable valve 72, is adapted to direct steam upon the top of the can during the interval that it pauses at station A.

Station B is provided with a spray nozzle 73 which is arranged between the rail supports 20 and which is adapted to spray water up into the interior of the can to subject it to a preliminary rinse. A butterfly valve 74 is arranged in the supply pipe beneath the nozzle 73 (see Figure 3). The stem 75 by which the valve is operated carries an arm 76 which is formed at one end 77 to extend into the path of the cans and which carries at its opposite end a weight 78 which serves normally to keep the said valve closed. As a can is moved to station B, its lip engages the end 77 of the arm to move it downwardly against the action of the weight and the valve is opened to permit water to be sprayed through the nozzle 73 into the can. The end 77 of the arm is held depressed as long as the can remains at this station, but as the can is moved away from the nozzle 73, the end of the valve operating arm is released and the supply of water to the nozzle is cut off until the valve is actuated by the next succeeding can.

A drain pan 79 is arranged in the frame of the machine beneath stations A and B and is adapted to receive any liquid or substance which may be removed from the cans while being treated at these two stations.

At stations C and D, the cans are subjected to solution washes. Each of these stations includes a nozzle 80 which is connected by a supply pipe 81 to a suitable pump, (not shown). As at station B each of the nozzles is connected to the source of supply through a valve, the operating lever of which normally extends into the path of the cans so that the valve may be opened by a can. A nozzle 82 (see Figure 3) at station D is suitably connected to the supply pipe 81 and is adapted to wash the top of the can as the latter is positioned over the nozzle 80 of this station. A vertical section 91 of pipe is supported at each side of the nozzle 80 and the said sections are perforated so that the washing solution may also be sprayed against the exterior of the can, the said sections being in communication with the source of supply through pipe 81.

A tank 83 is supported in the frame work of the machine beneath the rail supports 20 and a compartment 84 of the tank provides a reservoir for the washing solution. The compartment 84 is in communication with an auxiliary tank 85 through a conduit 86. A perforated partition or screen 87 is arranged in the tank 85 and divides the latter into inlet and outlet compartments 88 and 89 respectively. The outlet compartment 89 is in communication with a suitable pump (not shown) through a pipe 90 and the outlet of said pump is in communication with the nozzles 80 and 82 and the perforated pipes 91. Hence, there is a continuous circulation of the washing solution through the auxiliary tank 85 to the spray nozzles and perforated pipes, during which circulation solid materials are removed from the solution by the screen 87.

At station E a can which has just been subjected to solution washes at stations C and D is permitted to pause for draining. A nozzle 92 (see Fig. 3) connected to a convenient supply of steam is arranged to direct a jet of steam against the bottom of the can to remove the washing solution therefrom, it being noted that this station is also positioned above the tank compartment 84. Passage of steam through the nozzle 92 is controlled by a valve 92a.

At stations F, G and H a can which has been washed and drained is rinsed and sterilized. To this end, the tank 83 is constructed with a partition 93 to provide a tank compartment 94, the latter extending beneath these stations. The compartment 94 provides a reservoir for a supply of water which is heated in any suitable manner. A steam injector 95 is arranged in the tank compartment 94 at station F and is adapted to inject a spray of hot water into a can as it pauses at this station, the said injector being connected to a convenient supply of steam by means of a supply pipe 96. A valve 97 in the supply line controls the supply of steam to the injector. The steam in passing upwardly through the injector carries hot water from the tank compartment 94 and directs it into the can to rinse the same.

Figure 3:
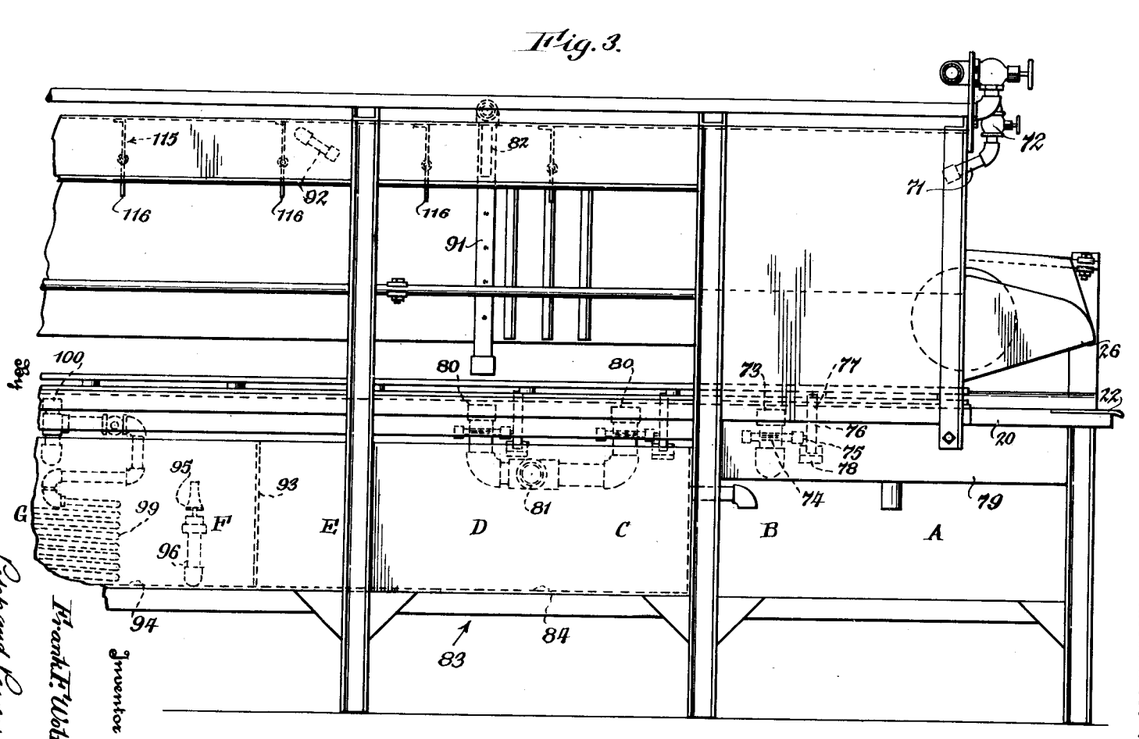
Figure 3 is a side elevation of the same end of the machine as shown in Figure 1, but of the opposite side.
Figures 9, 10:
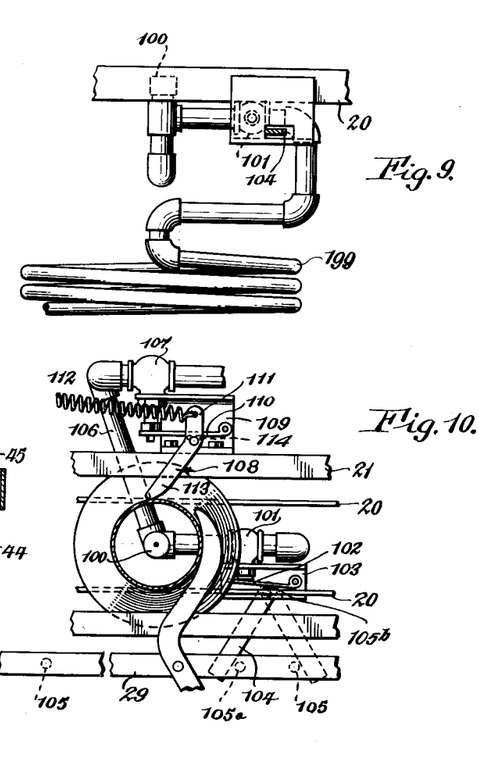
Figure 9 is a fragmentary detail view in elevation of the equipment of the station at which the cans are subjected to the sterilizing action of hot water and steam.
Figure 10 is a top view of the same.

At station G, means is provided for sterilizing the cans by the use of hot water and steam. For this purpose, a coil 99 is arranged in the tank compartment, the coil being in communication with a convenient supply of water and at its opposite end being connected with a nozzle 100 (Figures 3, 9 and 10). Communication between the coil 99 and the nozzle 100 is normally prevented by a valve 101. The operating lever 102 of the valve (Figures 9 and 10) is supported for pivotal movement by a channel member 103 which is suitably secured to one of the rail supports 20. A lever 104 is supported by the channel member 103. At its pivoted end, the said lever is formed with a cam 105b which cooperates with the operating lever 102 of the valve. The free end of the lever 104 extends beneath the finger support member 29 into the path of downwardly extending pins 105 and 105a which are carried thereby. The pin 105a is arranged to engage the free end of the lever 104 as a can is moved to the station G and move it to the position shown in full lines in Figure 10, in which position the valve 101 is open and hot water is sprayed into the can positioned above the nozzle 100. The lever 104 remains in this position during most of the return movement of the finger support 29. As it approaches the limit of this movement, the pin 105 engages the lever and moves it in the position shown in dotted lines, in which position the valve 101 is closed to cut off the spray of hot water. The nozzle 100 is also in communication with a supply of steam through a pipe 106, the latter including a valve 107. This valve and valves 92a and 97 at stations E and F, respectively, each includes an operating lever 108. The said lever is pivotally mounted upon a channel member 109 which is suitably secured to an adjacent guide rail 21 (see Figure 10). A lever 110 is also carried by the channel member 109. The lever 108 is provided with a cam 114 which co-operates with the lever 110. One end 111 of the lever 108 is connected by a spring 112 to the framework of the machine, the said spring serving normally to hold the other end 113 of the lever in the path of the cans but being yieldable as the end 113 is engaged by a can to permit the said end to swing to the position shown in which position the valve is held open. As the can is moved away, the end 113 of the lever is released and it returns to its normal position, thereby closing the valve.

From the foregoing, it will be apparent that as a can is moved to station G, the valve 101 is opened through the agency of the carriage member 29 while the valve 107 is opened by the can itself. Thus, the can is subjected to the sterilizing action of hot water and steam at the same time. Both valves remain open during part of the return movement of the carriage member 29. However, the hot water valve 101 is closed during the final movement of said member in the manner described. The steam valve 107, of course, remains open until the can has been moved forward to release the outer end of the lever 110. Hence, during the time that the carriage member 29 is moving the fingers 31 into the path of the cans to engage the latter, the can at station G is subjected to the sterilizing action of steam alone. The steam drives out the hot water remaining in the can while at the same time heating the latter thereby to hasten its subsequent drying.

In order to prevent splashing from one tank compartment to another during the washing and sterilizing operations, a series of depending baffles 115 (see Figure 3) are provided, each of which preferably includes a swinging member 116. The swinging members 116 extend below the top of the cans and are moved aside as the cans pass beneath them. Any liquid which is thrown upwardly will strike the top and rear wall of the machine and fall out of the compartments formed by the baffles into the tank compartment from which the liquid was taken.

Station H is provided with steam jets 117 and 118 which are connected to a convenient source of supply by a pipe 119. The jet 117 is arranged beneath a plate 120 which is supported upon the rail supports 20 and is adapted to direct steam through a suitable opening formed in said plate into a can as it pauses over the said opening. The jet 118 (see Figure 4) is arranged to project steam against the bottom of the can during this pause. Both jets are controlled by a valve 121 which is similar in construction and operation to the steam valve at station G.

After this final sterilizing treatment, a can is subjected to drying treatments at stations I and J. At station I, an opening 122 is formed in the plate 120. An exhaust pipe 123 is in communication with this opening and is connected to a suction fan (not shown) of any suitable construction. The fan preferably operates continuously and as a can is brought to rest over the opening 122, it draws out the moist air with which the can is filled. This air is forced by the fan through a pipe 124 to a vent stack 125 (see Figures 2 and 4). The pipe 124 terminates in a vertical extension 126 which extends parallel with the walls of the vent stack. As the air drawn through the opening 122 is forced out the extension 126 of the exhaust pipe, it creates a suction in the vent stack 125 and the moist air about the exterior of the can therebeneath is forced up the vent stack.

A nozzle 127 is arranged at station J and the said nozzle is connected to a convenient supply of filtered compressed air by a pipe 128. A valve 129, included in the supply line, is similar in construction and operation to the steam valve 107 of station G. Thus, as a can which has just had the moist air removed therefrom pauses at station J, a blast of clean air is directed into the same. This is the final treatment and as the can leaves this station it is ready for up-ending to receive its cover.

Figures 1, 19:
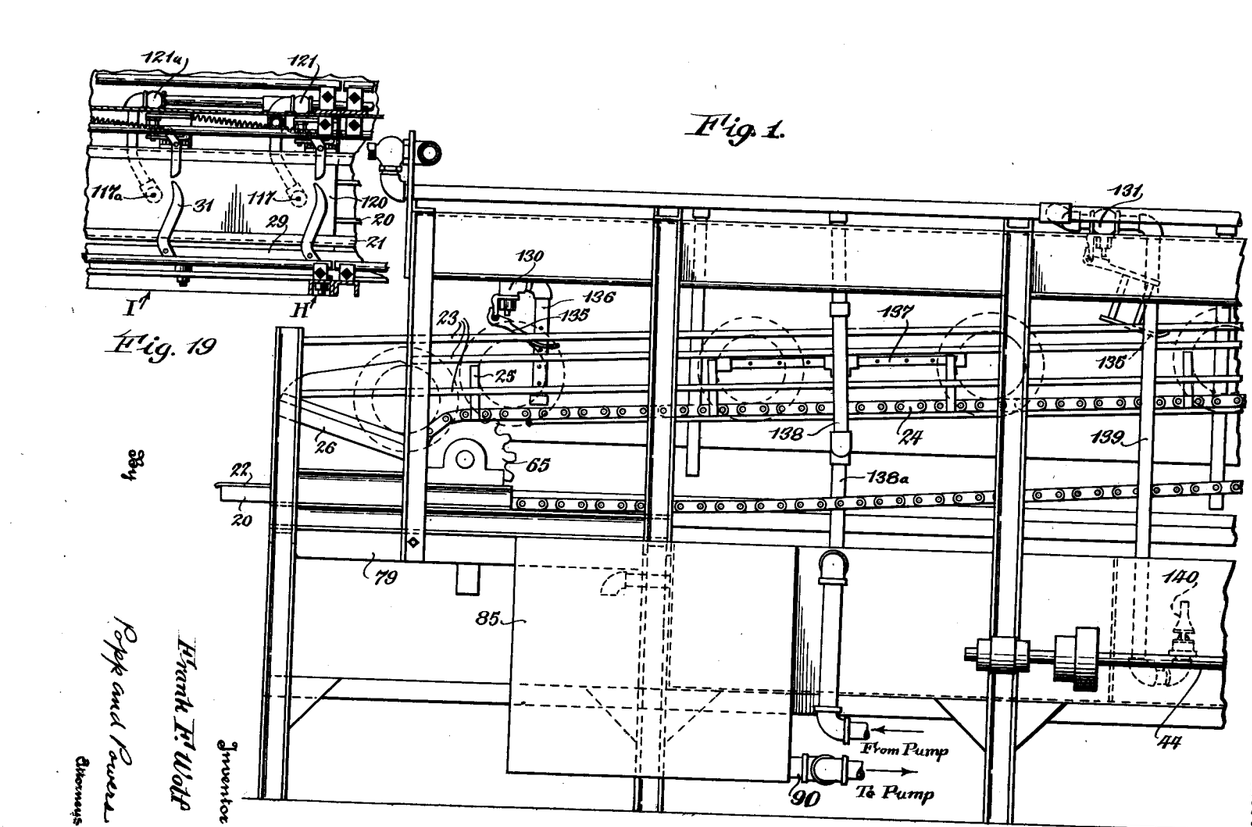
Figure 1 is a side elevation of the receiving end of a can washing machine constructed in accordance with the invention.
Figure 19 is a fragmentary view showing a modified arrangement of the sterilizing equipment.

In the modified arrangement of equipment shown in Figure 19 the can, after leaving station H, is advanced to a second sterilizing station I', which includes a jet 117a and control valve 121a therefor, where it is subjected to a treatment similar to that received at station H. From station I' the can is advanced to station J where it is treated in the manner described.

In connection with the final sterilizing treatments, whether there be one or more, it is to be noted that during such treatment or treatments, the can is supported by the lip of its mouth upon the plate 120, the latter closing the mouth of the can except for the small opening through which the steam is admitted. This results in a substantial saving in the steam required while at the same time preventing entry into the can of foreign substances which would not be removed in the subsequent treatments.

Figure 2:
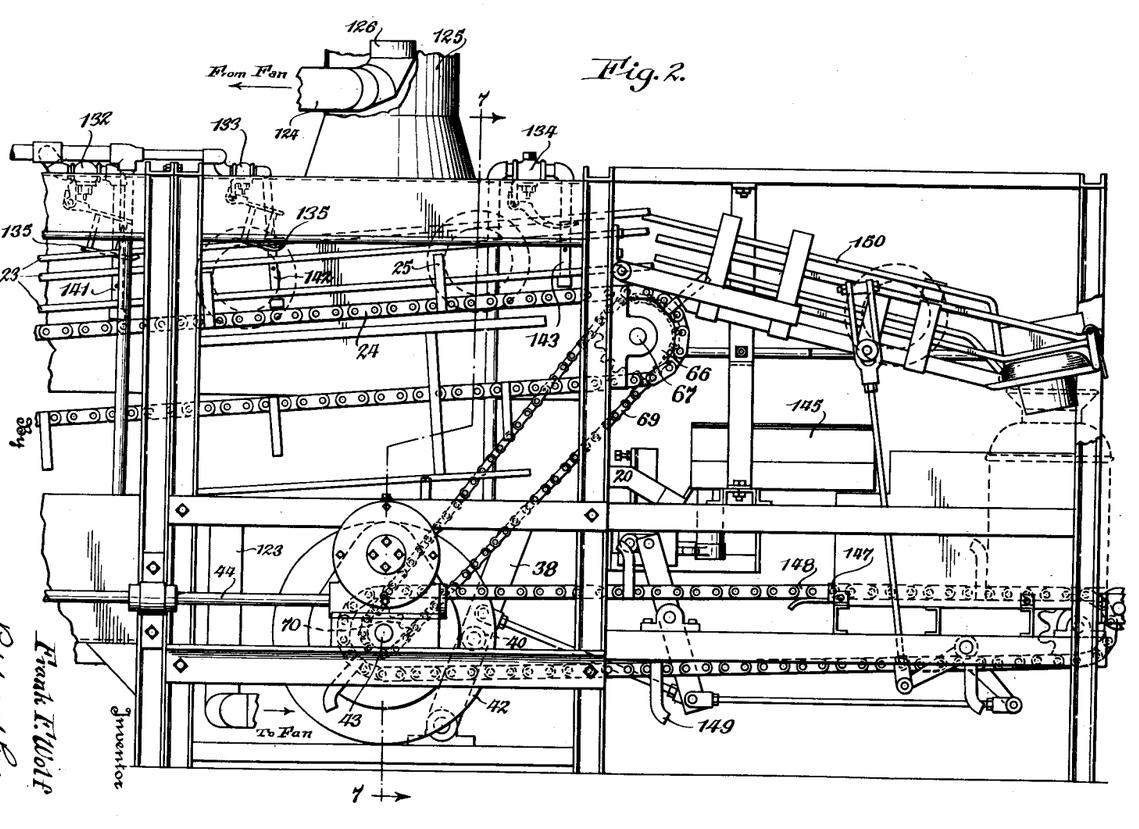
Figure 2 is a side elevation of the delivery end of the machine.

During the step-by-step movement of the can through the machine while it is being cleaned, its cover has moved continuously along the cover guideway and has also been subjected to a series of cleaning and sterilizing treatments. As best shown in Figures 1 and 2, each cover is adapted to operate a series of valves 130, 131, 132, 133 and 134 during its passage through the cover guideway. The said valves are normally closed. Each is provided with an operating lever 135 which extends downwardly into the path of the cover so that the neck of the latter engages and moves the lever 135 as it passes beneath the same to open the valve with which the lever is associated.

The valve 130 controls the supply of cold water to a pipe 136 which is arranged at the side of the cover guideway. The said pipe is perforated so as to project a series of jets of water against the cover as the latter opens the valve 130 to rinse the same.

Figure 5:
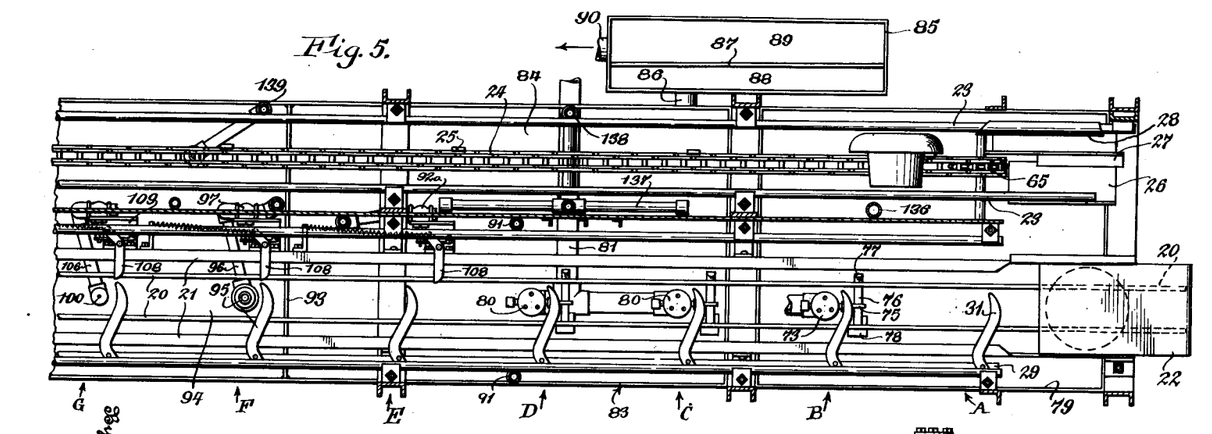
Figure 5 is a horizontal longitudinal section through the receiving end of the machine.
Figure 6:
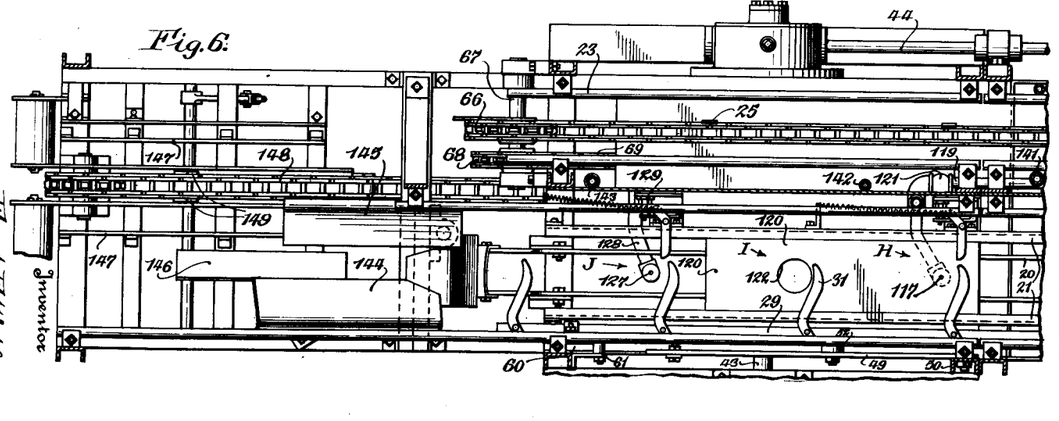
Figure 6 is a similar section through the delivery end of the machine.

After the preliminary rinse, the cover is subjected to a solution wash. For this purpose, a perforated pipe 137 is supported at one side and lengthwise of the cover guideway while a perforated pipe 138 arranged transversely of the guideway is supported at the opposite side thereof (see Figures 1 and 5). The perforated pipes are adapted to direct jets of the washing solution against opposite sides of the cover as it passes between them. Both of these pipes communicate with the source of supply through a pipe 138a.

As a cover operates the valve 131 steam passes through a pipe 139 to a steam injector 140 which is arranged in the tank compartment 94 beneath the cover guideway and hot water is directed upwardly against the cover to rinse it. After rinsing the cover is moved past perforated pipes 141 and 142, similar to the pipe 136, which are connected to the steam supply line, through valves 132 and 133 respectively and are sterilized by the action of steam.

As the cover moves beneath the lever 135 of the valve 134, the latter is opened and a blast of filtered compressed air is admitted to a perforated pipe 143 by which it is directed against the cover to dry the same.

The use of filtered compressed air in treating the cans and their covers has the advantage that the treatment may be rapid and effective. By admitting a jet of compressed air into the can instead of blowing a blast of air into the can, as is the present practice, a substantial saving is effected in the volume of air required. Filtered air is desirable as it does not counteract the sterilizing treatment or treatments to which the cans and covers have been previously subjected.

Although a can is moved step-by-step through the machine while its cover is moving therethrough continuously the mechanism by which the cans and covers are advanced is so constructed that the average rate of travel of a can through the machine is substantially the same as that of its cover. Hence, as they are both placed in the machine at approximately the same time, they arrive at the delivery mechanism at substantially the same time.

After leaving the jet 127, a can approaches the end of the runway and as it reaches the end of the rail supports 20, it is pushed therefrom by a finger 31. It tips forward and comes to rest in a substantially horizontal position between the side members 144 and 145 of the up-ending mechanism. The said members are arranged to provide a trough which is open at both ends. The side member 145 is supported for pivotal movement at its inner end and while the can is resting in this position it is actuated, whereby the outer free end thereof is moved away from the outer end of the fixed side member 144. This movement of the pivoted side member 145 continues until the can is supported beyond the center of gravity in the direction of its top. Thereupon, the can pivots between the side members of the trough toward an up-ended position, during which movement it passes downwardly between the said side members. As it moves downwardly bottom first, it is guided by a deflector plate 146 to a pair of rail supports 147 where it comes to rest upon its bottom. The up-ended can is pushed along the rail supports toward the cover receiving position by a chain 148, the latter carrying suitable fingers 149 for this purpose.

A can and its cover reach the ends of their respective guideways at about the same time and hence while the can is being up-ended and moved forward in the manner described, its cover has moved into a pivoted cover applying guide section 150. The cover rolls down the passageway provided by the said section and is righted at the end thereof in advance of the can at a position above the mouth of the latter. As the can advances toward the cover receiving position, the cover guide section 150 lowers and the means by which the said guide section is lowered and the means by which the can is up-ended and moved forward are so co-ordinated that as the can reaches the cover receiving position, the cover guide section 150 lowers the cover carried thereby into the mouth of the can.

This can up-ending and cover applying mechanism comprises the subject matter of my co-pending application, Serial No. 493,300, filed Nov. 4, 1930, now Patent No. 1,876,191, and hence no detail description is here given.

From the foregoing it will be apparent that the cans and covers to be treated are subjected to successive washing, sterilizing and drying operations economically and rapidly and are delivered from the machine in a clean and sanitary condition.

Having fully described my invention, I claim:

1. In a can washing machine, the combination with means for supporting the cans while being treated, reciprocable means for advancing a can along said supporting means and a treating station to which said can is moved, of means for subjecting the can simultaneously to two treating fluids and a valve operable by said advancing means while the can is pausing at said station for cutting off the supply of one treating fluid whereby the can is subjected only to the continued action of the other fluid.

2. In a can washing machine, the combination with means for supporting the cans while being treated, means for advancing a can along said supporting means and a treating station at which said can is treated, of means for subjecting the can to the action of two treating fluids, said means including a supply pipe for each of said fluids, a valve in each of said pipes, one of said valves being opened by said can as the latter is moved to said station and means carried by said advancing means for opening the other of said valves as said advancing means moves said can to said station.

3. In a can washing machine, the combination with means for supporting the cans while being treated, reciprocable means for advancing a can along said supporting means and a treating station at which said can is treated, of means for subjecting said can to the action of two treating fluids, said means including a nozzle, a supply pipe for each of said fluids in communication with said nozzle, a valve in each of said supply pipes, one of said valves being opened by said can as the latter is moved to said station and means carried by said advancing means for opening the other of said valves as said advancing means moves said can to said station, said other valve being closed during the return movement of said can advancing means, whereby the can is subjected only to the continued action of the fluid controlled by the first mentioned valve.

4. In a can washing machine, the combination with means for supporting the cans while being treated, reciprocable means for advancing a can along said supporting means and a treating station at which said can is treated, of means for subjecting said can to the action of water and steam, said means including a supply pipe for each of said fluids, a valve in each supply pipe, the valve in the steam supply pipe being opened by a can as the latter is moved to said station and means carried by said advancing means for opening the valve in the water supply pipe as it moves said can to said station, the valve in said water supply pipe being closed during the return movement of said advancing means, whereby the can is subjected to the continued action of steam to remove the water from said can and to heat the latter so that its subsequent drying is hastened.

In testimony whereof I affix my signature.

FRANK F. WOLF.